US006221803B1

(12) United States Patent
Vereecke

(10) Patent No.: US 6,221,803 B1
(45) Date of Patent: Apr. 24, 2001

(54) CATALYST AND PROCESS FOR ITS PREPARATION

(75) Inventor: Dominique Marie Vereecke, Dilbeek (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/296,984

(22) Filed: Apr. 22, 1999

(30) Foreign Application Priority Data

Apr. 24, 1998 (EP) .................................. 98107494

(51) Int. Cl.$^7$ ............................ B01J 31/00; B01J 37/00; C08F 4/02; C08F 4/60
(52) U.S. Cl. .................... 502/125; 502/132; 502/133; 502/134; 502/103
(58) Field of Search ................... 502/125, 132, 502/133, 134

(56) References Cited

U.S. PATENT DOCUMENTS

| 4,186,107 | * | 1/1980 | Wagner | 252/429 B |
| 4,223,118 | * | 9/1980 | Tsubaki et al. | 252/429 B |
| 4,873,300 | * | 10/1989 | Fuentes, Jr. et al. | 526/142 |
| 5,360,776 | * | 11/1994 | Iiskola et al. | 502/127 |
| 5,817,591 | * | 10/1998 | Shamshoum et al. | 502/107 |
| 5,849,655 | * | 12/1998 | Shamshoum et al. | 502/127 |
| 6,034,023 | * | 3/2000 | Kersting et al. | 502/127 |

FOREIGN PATENT DOCUMENTS

| 0068200 | 1/1983 | (EP) . |
| 0076653 | 4/1983 | (EP) . |
| 0093494 | 11/1983 | (EP) . |
| 2464965 | 3/1981 | (FR) . |

* cited by examiner

*Primary Examiner*—Mark L. Bell
*Assistant Examiner*—J. Pasterczyk
(74) *Attorney, Agent, or Firm*—Jim D. Wheelington

(57) ABSTRACT

A process for preparing a Ziegler-Natta catalyst, which process comprises:

(i) mixing in a hydrocarbon solvent a dialkyl magnesium compound of general formula $MgR^1R^2$ with a chlorinating agent soluble in the hydrocarbon solvent under conditions to precipitate controlledly a magnesium dichloride derivative, wherein $R^1$ and $R^2$ are each independently a $C_1$ to $C_{10}$ alkyl group, and the chlorinating agent is obtainable from the reaction between an alcohol of general formula $R^3OH$ and an alkyl aluminum chloride of general formula $R^4{}_n AlCl_{3-n}$, in which $R^3OH$ is a cyclic or branched $C_3$ to $C_{20}$ alcohol, each $R^4$ is independently a $C_2$ to $C_8$ alkyl and n is 1 or 2;

(ii) removing unwanted reducing species by washing or reaction; and (iii) titanating the magnesium dichloride derivative with a chlorinated titanium compound to produce the Ziegler-Natta catalyst.

14 Claims, No Drawings

CATALYST AND PROCESS FOR ITS PREPARATION

FIELD OF THE INVENTION

The present invention relates to a Ziegler-Natta type catalyst, a process for preparing such a catalyst and its use in polyolefin production.

BACKGROUND TO THE INVENTION

It is known that anhydrous magnesium dichloride derivatives which are suitable for the preparation of Ziegler-Natta catalysts can be obtained by reacting an organo magnesium or a Grignard reagent with a halogenated compound. For example, U.S. Pat. No. 4,186,107, and its equivalent FR-A-2464965, each describe the synthesis of a catalyst composed of a titanium halide deposited on a magnesium halide support. The support may be prepared by reacting a dialkyl magnesium with an alkyl aluminium halide in a hydrocarbon solvent. The support may be treated with an electron donor such as a dialkyl ether in order to provide a means for controlling its morphology. Very low temperatures are preferred in the synthesis of the catalyst and all the examples were conducted at around −65° C. This presents a serious disadvantage in the industrial applicability of this method.

EP-A-98196 reports the synthesis of magnesium dichloride catalyst supports having spherical particles of controllable size distribution by reacting a dialkyl magnesium with an alkyl chloride in the presence of an electron donor, preferably an ether.

EP-A-68200 describes a process for the production of granular ethylene polymers having a large, uniform particle size and a high bulk density. An organic magnesium compound is reacted with a hydropolysiloxane or a silicon compound to give a silicon-containing reaction product which is then reacted with the reaction product of an organic aluminium chloride compound with a mixture of alcohols. The product of this reaction is further reacted with a halogen-containing titanium or vanadium compound. This approach is further developed in U.S. Pat. No. 4,223,118 which also requires the use of the reaction product of an organic magnesium compound with a hydropolysiloxane or silicon compound. This silicon-containing reaction product is further reacted with an aluminium alkoxide which optionally contains a halogen atom. These processes suffer from a disadvantage that complex synthetic procedures are required to achieve the desired catalyst.

EP-A-093454 reports a solid catalyst component for alpha-olefin polymerisation made by reacting a magnesium compound such as n-butyl, sec-butyl-magnesium with a catalyst such as obtained by reacting aluminium chloride with ethyl benzoate. No steps are taken to control the morphology or particle size distribution of the solid catalyst component.

U.S. Pat. No. 4,873,300 reports a catalyst preparation by reacting with a reducing halide source a mixture of a hydrocarbon soluble magnesium alkyl compound, an aliphatic alcohol and a titanium compound.

SUMMARY OF THE INVENTION

The present invention provides a process for preparing a Ziegler-Natta catalyst, which process comprises:
(i) mixing in a hydrocarbon solvent a dialkyl magnesium compound of general formula $MgR^1R^2$ with a chlorinating agent soluble in the hydrocarbon solvent under conditions to precipitate controlledly a magnesium dichloride derivative, wherein $R^1$ and $R^2$ are each independently a $C_1$ to $C_{10}$ alkyl group preferably a $C_2$ to $C_8$ alkyl group, and the chlorinating agent is obtainable from the reaction between an alcohol of general formula $R^3OH$ and an alkyl aluminium chloride of general formula $R^4_nAlCl_{3-n}$, in which $R^3OH$ is a cyclic or branched $C_3$ to $C_{20}$ alcohol, each $R^4$ is independently a $C_2$ to $C_8$ alkyl and n is 1 or 2; and
(ii) titanating the magnesium dichloride derivative with a chlorinated titanium compound to produce the Ziegler-Natta catalyst.

The catalyst obtainable by this process produces polyolefins, especially polyethylene homopolymers or copolymers, with a low amount of fines of less than 125 μm, no agglomerates of greater than 1600 μm, a narrow particle size distribution, a high bulk density and a regular shape. Moreover, the catalyst has high activity and high sensitivity versus hydrogen.

The dialkyl magnesium compound is preferably n-butyl sec-butyl magnesium or butyl ethyl magnesium although other dialkyl magnesium compounds such as butyl octyl magnesium, dibutyl magnesium and dihexyl magnesium can be used. The dialkyl magnesium derivative should be soluble in the hydrocarbon solvent used in the process.

The chlorinating agent obtainable from the reaction between the alcohol and the alkyl aluminium chloride may have the general structure $(R^3O)_nAlCl_{3-n}$, preferably $(R^3O)_2AlCl$. The alcohol is selected such that, after reaction with the alkyl aluminium chloride, the chlorinating agent product is a compound soluble in the hydrocarbon solvent used in the process. This is important for particle size and particle size distribution control. The alcohol may be 2-ethyl-1-hexanol, 2-methyl-1-pentanol, 2-ethyl-1-butanol, 2-methyl-2-propanol, 2-methyl-1-propanol, cyclopentanol or cyclohexanol, preferably 2-ethyl-1-hexanol. The preferred alkyl aluminium chloride is diethyl aluminium chloride.

The molar ratio of the alcohol to the alkyl aluminium chloride is usually from 0.5 to 2.5, preferably about 2. The molar ratio of the alkyl aluminium chloride to the dialkyl magnesium compound is usually in the range of from 0.8 to 2.2.

Other methods of making compounds of the formula $(R^3O)_nAlCl_{3-n}$ include reacting together an alkoxy aluminium derivative $Al(OR^3)_3$, such as aluminium ethoxide or isopropoxide, with a chlorinating agent, typically an acyl halide such as acetyl chloride.

Any non-aromatic hydrocarbon solvent may be used in the process although, from a practical viewpoint, it is usual for the solvent to be removed subsequently. Hydrocarbon solvents of less than 6 carbon atoms tend to boil too easily whereas hydrocarbon solvents having more than 7 carbon atoms are often difficult to remove. Accordingly, preferred hydrocarbon solvents are hexane or heptane.

In step (ii) any chlorinated titanium compound suitable for titanating the magnesium dichloride derivative may be used. Such chlorinated titanium compounds include $TiCl_4$, $TiCl_3OR^5$, $TiCl_2OR^5_2$, $TiClOR^5_3$, or mixtures thereof, in which each $R^5$ is independently a $C_2$ to $C_8$ alkyl, preferably $TiCl_4$.

A dialkyl ether may be added into the process to improve the fluff bulk density achieved during polyolefin synthesis. Preferably, the dialkyl magnesium compound is premixed in the hydrocarbon solvent with an acyclic dialkyl ether of general formula $R^5—O—R^6$, in which $R^5$ and $R^6$ are each independently $C_2$ to $C_{10}$ alkyl groups. Preferably, the dialkyl ether is diisoamyl ether. The molar ratio of the dialkyl magnesium compound to the dialkyl ether is preferably 1.93.

The ether is used to increase the polyolefin fluff bulk density but has little or no influence on the catalyst granulometry or particle size distribution.

Turning to the general procedure for preparing the Ziegler-Natta catalyst, the dialkyl magnesium compound may be dissolved in the hydrocarbon solvent and mixed with the dialkyl ether at room temperature to form a solution. The alcohol may be added to the alkyl aluminium chloride which is dissolved in the hydrocarbon solvent to form a solution. This solution may be left at room temperature for a period of at least 0.5 hours so as to ensure that a reaction takes place between the alcohol and the alkyl aluminium chloride to form the chlorinating agent. Alternatively, the dialkyl magnesium compound and the chlorinating agent may be added to the solvent at the same time. However normal, the reaction mixture can be stored under an inert atmosphere for of the order of 4 to 6 days without degradation.

The solution of the chlorinating agent, usually in the hydrocarbon solvent, is mixed rapidly with a solution of the dialkyl magnesium compound in the hydrocarbon solvent, for example by dropwise addition, so as to achieve mixing with controlled precipitation. Under these conditions, the "$MgCl_2$" precipitation proceeds very slowly and a good control of the particle size and the particle size distribution is achieved. A catalyst of poor morphology is obtained if the mixing is performed without appropriate control, for example where a solution of the dialkyl magnesium compound is added to excess chlorinating agent (i.e. in the reverse order).

The magnesium dichloride derivative is preferably aged without agitation, usually at ambient temperature in the range 20° to the boiling point of the hydrocarbon solvent preferably about 85° C., generally for a period in the range 1 hr to 1 week, prior to titanation step (ii). Aging generally requires further heating of the magnesium dichloride derivative in suspension so as to produce a catalyst with improved morphology.

Preferably, the magnesium dichloride derivative precipitated from step (i) is washed with the hydrocarbon solvent to remove reaction by-products prior to titanation step (ii). Usually, the magnesium dichloride derivative is washed several times with the hydrocarbon solvent. This helps prevent $TiCl_3$ precipitation during the titanation step, which would otherwise result in a catalyst with poor morphology.

The titanation agent may be added dropwise, usually at room temperature to the magnesium dichloride derivative to produce the catalyst. Usually, the reaction proceeds first at room temperature then at 50° C. and finally at 98° C. The catalyst may then be washed 4 times at 60° C. with the hydrocarbon solvent. The catalyst may be used in olefin polymerisation, such as ethylene polymerisation or copolymerisation, in the form of a slurry or after drying.

DETAILED DESCRIPTION OF THE INVENTION

The present invention will now be described in further detail by way of example only, with reference to the following Examples.

EXAMPLES

Catalyst Synthesis

1. Raw Materials

All manipulations are conducted under nitrogen atmosphere. n-butyl sec-butyl magnesium (DBM) (1M in heptane) and TiCl4 are purchased from Aldrich and used as received. Diethyl aluminium chloride (DEAC) (25 wt % solution in heptane and butyl ethyl magnesium (BEM) (15 wt % in heptane) are purchased from Akzo. The alcohols are purchased from Aldrich and dried over molecular sieve (3A°). Diisoamyl ether (DIAE) is purchased from Aldrich, dried and distilled over sodium/benzophenone. Heptane and hexane are dried and distilled over sodium/benzophenone.

2. Chlorinating Agent General Preparation Procedure

DEAC (0.05 mole) is weighed into a 500 ml round bottom flask and diluted with 50 ml heptane, in a nitrogen box. The flask is then equipped with a thermometer, a magnetic stirrer, a 100 ml pressure-equalized dropping funnel and a gas inlet. The system is taken out of the nitrogen box and connected to a nitrogen inlet system.

An alcohol (0.1 mole dissolved in 40 ml heptane) is transferred to the dropping funnel and added dropwise at room temperature (22–25° C.) to the DEAC/heptane solution (addition time: 10'). The reaction is exothermic (T° goes up to 55° C.) and the formation of fumes is observed. The mixture is left over night: at room temperature without agitation. For convenience, the solution is usually left for the night at room temperature. However, no differences were observed for shorter (2 hours) or longer (2–4 days) reaction times. This method was used with the following alcohols: cyclopentanol, 2-ethyl-1-hexanol, 2-methyl-1-pentanol, 2-methyl-2-propanol, and 2-methyl-1-propanol. In each case, a clear solution is obtained.

The method was repeated using the aromatic or linear alcohols phenol, benzyl alcohol, ethanol, and octanol. In each case, a white solid derivative is produced which is insoluble in the reaction solvent. This indicates a lack of suitability for those alcohols in the production of a hydrocarbon soluble chlorinating agent.

3. Catalyst Preparation

In the following examples, a chlorinating agent prepared as described above with 2-ethyl-1-hexanol as the alcohol is used in the production of a catalyst based on n-butyl sec-butyl magnesium (DEM) or butyl ethyl magnesium (BEM).

Catalyst A

DBM (0.027 mole) is weighed into a 4-neck, 1 L round bottom flask and diluted with 90 ml of heptane in the nitrogen box. The flask is then equipped with a mechanical stirrer, a 100 ml pressure-equalized dropping funnel, a thermometer and a condenser. The flask is taken out of the dry box and connected to a nitrogen inlet system. The solution is stirred at room temperature at a rate of 200 rpm.

Diisoamyl ether (DiAE) (0.014 mole, diluted with 10 ml heptane) is transferred to the 100 ml dropping funnel on the 1 L flask and added dropwise (in about 5') at room temperature to the DBM/heptane mixture. The dropping funnel is rinsed with 20 ml of heptane and the stirring is continued for 15'. No apparent change is observed.

The DEAC/2-ethyl-1-hexanol chlorinating agent mixture is added dropwise at 22–25° C., via the dropping funnel, to the DBM/DIAE/heptane solution. Precipitation (white solid) begins after addition of about 35–40 ml (total volume 140 ml). Total addition takes about 1 hr. The dropping funnel is rinsed with 50 ml of heptane. Agitation is continued for 1 hr at room temperature then for 2 hrs at 98° C. (oil bath T°: 110° C.). The temperature of the oil bath is decreased to 85° C. (T° in the flask: 75° C.). The agitation is stopped. The settling of the solid is very fast (less than 5'); however the supernatant remains cloudy. The temperature is held at 85° C. for the night (about 15 hrs).

The supernatant is decanted via a cannula and the "MgCl2" is washed with 250 ml portions of heptane, 4 times at 50° C. After washings, the white "MgCl2" is slurried in about 250 ml of heptane.

TiCl4 (0.06 mole in 90 ml heptane) is added dropwise (in 45', T°=24° C., goes up to 28° C.). The mixture becomes slightly yellow. Stirring is continued for 1 hr at room temperature then for 5 hrs at 50° C. and finally for 2 hrs at 98° C. Agitation and heating are stopped for the night.

Washings are performed at 50° C. with hexane (4×250 ml). The settling is fast (<5') The final catalyst is pale brown and used as slurry for the polymerisations.

A catalyst sample is dried (filtration on a P3 coarse filter then vacuum drying at 50° C.) and a fine tan powder (no agglomerates) is obtained.

Catalyst B

This catalyst was prepared in exactly the same manner as catalyst A except that BEM was used instead of DBM. The chlorinating agent mixture is added dropwise at 25° C. to the BEM/DIAE/heptane solution and precipitation begins after addition of about 20 ml (15 mins). The TiCl4 is added dropwise in 50 mins.

COMPARATIVE EXAMPLES

Catalyst C1 (using DEAC as chlorinating agent)

DBM (0.5 mole) is weighed into a 4-neck, 1 L round bottom flask and diluted with 50 ml of heptane in the nitrogen box. The flask is then equipped with a mechanical stirrer, a 100 ml pressure-equalized dropping funnel, a thermometer and a condenser. The solution is stirred at room temperature at a rate of 310 rpm.

DEAC (0.1 mole, diluted with 90 ml of heptane) is added dropwise at room temperature to the DBM/heptane mixture. During the addition, a white MgCl2 precipitate is formed. The solid appears to be colloidal and does not settle, even after an extended period of time (5 hrs).

The suspension is further heated for 2 hours at 90° C., under agitation. Heating does not improve the MgCl2 settling.

The temperature is decreased to room temperature and TiCl4 (0.05 mole, in 90 ml heptane) is added dropwise over 45'. The slurry turns grey-black. Stirring is continued for 1 hr at room temperature then for 1 hr at 50° C.

Washings are performed at 50° C. with hexane (4×250 ml). The settling is improved and takes only 20'. The final catalyst is dark grey and used as slurry for the polymerizations.

This example shows that DEAC alone is not suitable for chlorinating agent for the production of catalysts with a controlled narrow particle size distribution (see table 2: PSD Broadness: 30.3 compared to 19.4 for the catalyst of the invention A). The C1 catalyst produces polymer fluff with a high level of fines below 125μ (see table 4: 12.3 wt % compared to 0.4 wt % for the invention catalyst) and a lot of aggregates above 1600 μm (see table 4: 4 wt % compared to 0 wt % for the catalyst of the invention).

Catalyst C2 (no DIAE addition)

This catalyst is prepared in exactly the same manner as invention catalyst A except that no DIAE is used.

This example shows that DIAE:
increases the fluff bulk density (from 0.15 g/cc to 0.26 g/cc; see table 3)
has no influence on the fines content in the polymer fluff (see table 4: 0.2 wt % below 125 μm compared to 0.4 wt % for the catalyst A).

has little influence on the catalyst particle size distribution (see table 2: PSD Broadness: 24.1 for C2 compared to 19.4 for the catalyst of the invention A).

Catalyst C3 (reverse addition)

This catalyst is prepared in exactly the same manner as the catalyst of the invention A except that a reverse addition process is used: DBM is added dropwise to the DEAC/2-ethyl-1-hexanol mixture; no DIAE is added.

This example shows that this process is not suitable for the production of a catalyst with a narrow particle size distribution (see table 2: PSD Broadness: 25.5 compared to 19.4 for the catalyst of the invention A).

The fluff produced with the C3 catalyst contains a high amount of fines below 125 μm (see table 4: 8.4 wt % compared to 0.4 wt % for invention catalyst A) and a lot of agglomerates (see table 4: 6.5 wt % compared to 0 wt % for the catalyst of the invention A).

Catalyst C4 (no aging process)

This catalyst is prepared in exactly the same manner as invention catalyst A except that the aging procedure is omitted.

After the addition of the DEAC/2-ethyl-1-hexanol chlorinating agent to the DBM/DIAE mixture, the agitation is continued for 1 hr at room temperature then for 2 hrs at 98° C. The agitation is stopped, the supernatant is decanted and the "MgCl2" is washed as described for catalyst A.

This example shows that the aging process is needed for the production of a catalyst with a narrow particle size distribution (see table 2: PSD Broadness: 37.6 for C4 catalyst (without aging process) compared to 19.4 for the catalyst of the invention A).

The C4 catalyst produces PE fluff with a lot of fines below 125 μm(see table 4: 17.1 wt % compared to 0.4 wt % for the invention catalyst A) and a high level of agglomerates above 1600 μm(see table 4: 10.4 wt % compared to 0 wt % for the catalyst of the invention A).

4. Results (a) Catalyst Synthesis

TABLE

Elemental analysis of dried catalysts

| CATALYST TYPE | Ti wt % | Mg wt % | Cl wt % | Al wt % |
|---|---|---|---|---|
| Catalyst A (DBM) | 11.0 | 10.5 | 52.5 | 2.8 |
| Catalyst B (BEM) | 4.3 | 15.3 | 59.3 | 1.7 |
| C1 (Comparative expl) | 19.9 | 8.0 | 49.6 | 4.8 |
| C2 (Comparative expl) | 15.3 | 7.9 | 49.3 | 4.2 |
| C3 (Comparative expl) | 11.1 | 7.7 | 52.5 | 2.2 |
| C4 (Comparative expl) | 9.9 | 13.0 | 52.3 | 2.2 |

Catalyst Particle Size Distribution

The catalyst particle size distributions (PSD) are shown on Table 2. The catalyst average particle sizes are listed below and compared with the catalysts of the Comparative Examples.

TABLE 2

Catalyst Particle Size Distribution

| Catalyst Type | d10 (μm) | d50 (μm) | d90 (μm) | PSD Broadness (*) |
|---|---|---|---|---|
| Catalyst A (invention) | 22.8 | 43.4 | 64.8 | 19.4 |
| Catalyst B (invention) | 12.3 | 25.8 | 38.2 | 20.1 |
| C1 (Comparative expl) | 3.2 | 9.7 | 17.9 | 30.3 |
| C2 (Comparative expl) | 20.5 | 38.4 | 66.8 | 24.1 |
| C3 (Comparative expl) | 3.7 | 8.4 | 18.6 | 35.5 |
| C4 (Comparative expl) | 2.2 | 9.8 | 20.6 | 37.6 |

(*) Broadness = 20 (d90–d10)/d50
50: defined as the particle size at which 50% of the weight of the total catalyst in consideraton is less than that size.

As can be seen, the $d_{50}$ values of the catalysts of the invention are generally larger than the catalysts of the Comparative Examples. Catalyst B has a much larger $d_{50}$ than catalyst A. The catalysts of the present invention having a narrower PSD than those of the Comparative Examples.

(b) Polymerisation Results

The polymerisations are performed in a 4 liter stainless steel reactor fitted with a stirrer operating at a speed of 500 rpm (revolutions per minute).

The reactor is first loaded with 1.5 liters of purified iC4. The temperature is then increased to 90° C. and 4.7 Nl of hydrogen is introduced into the reactor.

The catalyst (20 mg) and the cocatalyst (TIBAL; 10 wt % solution in hexane; 80 ppm versus iC4) are introduced into the reactor by means of 0.5 l of iC4.

The polymerisation is carried out for 1 hour, while continuously feeding ethylene to maintain the total pressure at 20.7 bars.

The results are shown in Table 3

TABLE 3

| Catalyst Type | Productivity (gPE/gcat.h) | MI5 (g/10') | Bulk Density (g/cc) |
|---|---|---|---|
| Catalyst A (invention) | 19000 | 7.2 | 0.26 |
| Catalyst B (invention) | 16100 | 9.9 | 0.32 |
| C1 (Comparative expl) | 8250 | 0.1 | 0.11 |
| C2 (Comparative expl) | 6050 | 0.6 | 0.15 |
| C3 (Comparative expl) | 11850 | 8.5 | 0.24 |
| C4 (Comparative expl) | 11100 | 11.0 | 0.27 |

Table 3 compares the activities for the different catalytic systems, using slurry catalysts in the production of polyethylene.

As can be seen from this Table, the activity for catalyst A (DBM) is higher than that for catalyst B (BEM). Catalysts C1 to C4 all have lower activity Fluffs Particle Size Distribution Table 4 shows the fluffs particle size distributions for the catalysts A, B and C1 to C4.

Both catalysts A and B produce fluffs with zero fines at <63 μm and peak size distribution at 500 μm of 87.6–87.8%.

TABLE 4

Fluff particle size distribution

| Catalyst Type | Fluff Granulometry μm | | | | | | | |
|---|---|---|---|---|---|---|---|---|
| | <63 | 63 | 125 | 250 | 500 | 1000 | 1600 | 2000 |
| Catalyst A | 0.0 | 0.4 | 2.0 | 9.2 | 87.8 | 0.6 | 0.0 | 0.0 |
| Catalyst B | 0.0 | 0.2 | 0.6 | 9.2 | 87.6 | 2.2 | 0.2 | 0.0 |
| C1 (comp. expl) | 0.9 | 11.4 | 28.9 | 34.9 | 15.4 | 3.4 | 1.1 | 4.0 |
| C2 (comp. expl) | 0.0 | 0.2 | 4.4 | 24.7 | 47.2 | 10.6 | 7.2 | 5.7 |
| C3 (comp. expl) | 0.5 | 7.9 | 51.8 | 25.1 | 6.7 | 0.9 | 0.5 | 6.5 |
| C4 (comp. expl) | 2.4 | 14.7 | 38.1 | 27.5 | 3.7 | 1.8 | 1.4 | 10.4 |

What is claimed is:

1. A process for preparing a Ziegler-Natta catalyst, which process comprises:
   (i) mixing in a hydrocarbon solvent a dialkyl magnesium compound of general formula $MgR^1R^2$ with a chlorinating agent soluble in the hydrocarbon solvent under conditions to precipitate a magnesium dichloride, wherein $R^1$ and $R^2$ are each independently a $C_1$ to $C_{10}$ alkyl group, and the chlorinating agent is obtained from the reaction between an alcohol of general formula $R^3OH$ and an alkyl aluminum chloride of general formula $R^4{}_nAlCl_{3-n}$, in which $R^3OH$ is a cyclic or branched $C_3$ to $C_{20}$ alcohol, each $R^4$ is independently a $C_2$ to $C_8$ alkyl and n is 1 or 2;
   (ii) removing unwanted reducing species; and
   (iii) titanating the magnesium dichloride with a chlorinated titanium compound to produce the Ziegler-Natta catalyst.

2. A process according to claim 1, wherein the dialkyl magnesium compound is n-butyl sec-butyl magnesium or butyl ethyl magnesium.

3. A process according to claim 1, wherein the alcohol is 2-ethyl-1-hexanol, 2-methyl-1-pentanol, 2-ethyl-1-butanol, 2-methyl-2 propanol, 2-methyl-1-propanol, cyclopentanol or cyclohexanol.

4. A process according to claim 1, wherein the alkyl aluminum chloride is diethyl aluminum chloride.

5. A process according to claim 1, wherein the chlorinated titanium compound is $TiCl_4$, $TiCl_3OR^5$, $TiCl_2OR^5{}_2$, $TiClOR^5{}_3$ or mixtures thereof, in which each $R^5$ is independently a $C_2$ to $C_8$ alkyl.

6. A Process according to claim 1, wherein the hydrocarbon solvent comprises a non-aromatic hydrocarbon solvent.

7. A process according to claim 6, wherein the non-aromatic hydrocarbon solvent is hexane or heptane.

8. A process according to claim 1, wherein the dialkyl magnesium compound is premixed in the hydrocarbon solvent with an acyclic dialkyl ether of general formula $R^5—O—R^6$, in which $R^5$ and $R^6$ are each independently a $C_2$ to $C_{10}$ alkyl group.

9. A process according to claim 8, wherein the dialkyl ether is diisoamyl ether.

10. A process accordingly to claim 1, wherein a solution of the chlorinating agent is mixed with a solution of the dialkyl magnesium compound in the hydrocarbon solvent.

11. A process according to claim 1, wherein the magnesium dichloride derivative is aged without agitation at a temperature in the range 20° C. to the boiling point of the hydrocarbon solvent, prior to titanation step (iii).

12. A process according to claim 11, wherein the magnesium dichloride derivative is aged for a period of from 1 hr to 1 week.

13. A process according to claim 1, wherein the magnesium dichloride precipitated from step (i) is washed with the hydrocarbon solvent to remove reaction by-products prior to titanation step (ii).

14. A Ziegler-Natta catalyst obtained by
(i) mixing in a hydrocarbon solvent a dialkyl magnesium compound of general formula $MgR^1R^2$ with a chlorinating agent soluble in the hydrocarbon solvent under conditions to precipitate a magnesium dichloride, wherein $R^1$ and $R^2$ are each independently a $C_1$ to $C_{10}$ alkyl group, and the chlorinating agent is obtained from the reaction between an alcohol of general formula $R^3OH$ and an alkyl aluminum chloride of general formula $R^4{}_nAlCl_{3-n}$, in which $R^3OH$ is a cyclic or branched $C_3$ to $C_{20}$ alcohol, each $R^4$ is independently a $C_2$ to $C_8$ alkyl and n is 1 or 2;

(ii) removing unwanted reducing species; and (iii) titanating the magnesium dichloride with a chlorinated titanium compound.

* * * * *